(12) United States Patent
Podsiadlo

(10) Patent No.: US 7,136,833 B1
(45) Date of Patent: Nov. 14, 2006

(54) COMMUNICATION NETWORK BASED SYSTEM AND METHOD FOR AUCTIONING SHARES ON AN INVESTMENT PRODUCT

(76) Inventor: Eugene Lawrence Podsiadlo, 301 N. Harrison St. Suite 185, Princeton, NJ (US) 08540

( * ) Notice: Subject to any disclaimer, the term of this patent is extended or adjusted under 35 U.S.C. 154(b) by 780 days.

(21) Appl. No.: 09/668,547

(22) Filed: Sep. 25, 2000

(51) Int. Cl.
 *G06Q 40/00* (2006.01)
(52) U.S. Cl. ..................................................... 705/37
(58) Field of Classification Search ................. 705/35, 705/36, 37
See application file for complete search history.

(56) References Cited

U.S. PATENT DOCUMENTS

| | | | | |
|---|---|---|---|---|
| 4,346,442 | A | 8/1982 | Musmanno | 364/408 |
| 4,674,044 | A | 6/1987 | Kalmus et al. | 364/408 |
| 4,694,397 | A | 9/1987 | Grant et al. | 364/408 |
| 4,903,201 | A | 2/1990 | Wagner | 364/408 |
| 4,980,826 | A | 12/1990 | Wagner | 364/408 |
| 5,517,406 | A | 5/1996 | Harris et al. | 364/408 |
| 5,794,207 | A | 8/1998 | Walker et al. | 705/23 |
| 5,794,219 | A | 8/1998 | Brown | 705/37 |
| 5,806,048 | A | 9/1998 | Kiron et al. | 705/36 |
| 5,835,896 | A | 11/1998 | Fisher et al. | 705/37 |
| 5,890,138 | A | 3/1999 | Godin et al. | 705/26 |
| 5,905,974 | A | 5/1999 | Fraser et al. | 705/37 |
| 5,905,975 | A | 5/1999 | Ausubel | 705/37 |
| 5,918,218 | A | 6/1999 | Harris et al. | 705/37 |
| 5,924,082 | A | 7/1999 | Silverman et al. | 705/37 |
| 5,995,947 | A | 11/1999 | Fraser et al. | 705/38 |
| 6,012,045 | A | 1/2000 | Barzilai et al. | 705/37 |
| 6,021,398 | A | 2/2000 | Ausubel | 705/37 |
| 6,161,099 | A | 12/2000 | Harrington et al. | 705/37 |
| 6,260,024 | B1 | 7/2001 | Shkedy | 705/37 |
| 6,321,212 | B1 * | 11/2001 | Lange | 705/37 |
| 6,408,282 | B1 * | 6/2002 | Buist | 705/37 |
| 6,415,270 | B1 * | 7/2002 | Rackson et al. | 705/37 |
| 6,601,044 | B1 * | 7/2003 | Wallman | 705/36 |
| 6,631,356 | B1 * | 10/2003 | Van Horn et al. | 705/26 |
| 6,697,824 | B1 * | 2/2004 | Bowman-Amuah | 709/229 |

\* cited by examiner

*Primary Examiner*—Vincent Millin
*Assistant Examiner*—Thu Thao Havan
(74) *Attorney, Agent, or Firm*—Stroock & Stroock & Lavan LLP

(57) ABSTRACT

A communication network based system and method for auctioning shares of investment product is disclosed. In the preferred embodiment, an investment company pursuant to the Investment Company Act of 1940, creates a publicly registered investment product (e.g., a mutual fund) with its own capital and as sole shareholder. After the investment product returns a pre-determined hurdle rate, or rate of return, the investment company then preferably liquidates its investment position in the investment product in order to freeze the net asset value of the shares of the mutual fund. The investment product is later opened for auction and the server system receives and stores bids from a plurality of bidders, in increments up to the net asset value. The bids preferably comprise a bid price per share and the number of shares bid. At the close of the auction, the server system preferably determines winning bidders by successively determining the highest bidder. During this process, the server system reduces the total number of available shares to be distributed by the number of shares bid by the highest bidder. Once all of the available shares have been allocated to the winning bidders, the investment product shares are redeemed at the net asset value reflecting the hurdle rate. Each of the winning bidders is receives a return equal to the difference between the net asset value and the respective winning bidders' bid price per share multiplied by the number of shares bid by each respective winning bidder.

8 Claims, 16 Drawing Sheets

COMMUNICATION NETWORK BASED SYSTEM AND METHOD FOR AUCTIONING SHARES ON AN INVESTMENT PRODUCT

FIELD OF THE INVENTION

The present invention generally relates to the field of investment products, including, but not limited to mutual funds, and to the field of conducting auctions over a communications network, such as the Internet. More particularly, the present invention relates to a communication network based system and method for auctioning shares of a pooled investment product that periodically declares a net asset value per share or unit. Such products include the vehicles known as mutual funds that are regulated under Sections 4 and 5 of the Investment Company Act of 1940.

BACKGROUND OF THE INVENTION

A mutual fund is a pooled collection of stocks, bonds, other securities and/or financial instruments managed by a financial investment company. Some benefits of investing in a mutual fund include professional investment management, diversification of risks through a variety of investments and economies of scale. Investors achieve returns of the investments in the mutual fund in two ways: (1) by receiving income generated by the investments of the mutual fund; and (2) by sharing in the net appreciation of the investments of the mutual fund. With over $7 trillion in assets today, mutual funds are a well-respected vehicle that forms the basis of financial planning for many investors.

Shares in mutual funds are sold at net asset value (NAV) to investors. Net asset value or unit price per share is determined by dividing the total assets of the mutual fund, minus its expenses and liabilities, by the total number of shares outstanding of the mutual fund. In accordance with Rule 22c-1 of the Investment Company Act of 1940 (the "1940 Act"), the net asset value of the shares of each mutual fund is determined daily, at 4:00 p.m., Eastern Time.

A mutual fund, like many investment products, provides exposure to market and investment risk. That is, investors still bear the risk that their investments may not achieve a desired expected return and that the mutual fund may decrease in value. The net asset value of a mutual fund will, by definition, fluctuate in response to the value of its underlying investments. Accordingly, the prospective investment return at the time of investment is entirely unknown; the net asset value after purchase may go up, it may go down, or it may not change at all.

It would be desirable to have a system and method of auctioning shares of a mutual fund wherein investors may achieve investment returns on their investment by knowing in advance what the net asset value of the shares of the mutual fund will be as of a particular forward date, and buying shares at a discount to that forward net asset value through an auction process.

Communications network based systems and methods for conducting auctions are known in the art. In such systems, bidders, via a bidder computer, are able to communicate with a server computer over a communications network, such as the Internet. Residing on the server computer is a web site. A bidder, via a bidder computer, is able to access the web site, view information about the items open for auction, and submit bids on the items.

However, what is not known in the art is a communications based system and method for auctioning shares of an investment product whose net asset value can be determined at a forward date or otherwise specified. It would be further desirable to have a communications based system and method for auctioning shares of such an investment product wherein investors may eliminate most of their investment risk by purchasing a portion of the returns already generated by the investment manager and bid freely and anonymously among an investor population for those returns.

SUMMARY OF THE INVENTION

The present invention relates to a communications network based system and method for auctioning shares of an investment product. Preferably, the entity offering the investment product for auction is an investment company formed under the Investment Company Act of 1940. Preferably, the investment product has a net asset value that can be determined at a forward date or otherwise specified according to Rule 22c-1 under the 1940 Act.

In a preferred embodiment, an investment company creates and seeds a publicly registered investment product, typically a mutual fund, with its own capital. The company actively manages the mutual fund's assets with the objective of obtaining a pre-determined hurdle rate, or rate of return. Once this return has been achieved and is reflected in the net asset value of shares of the mutual fund, the investment company sells its positions and purchases money market instruments (e.g., short-term U.S. Treasury bills) or other cash equivalents in order to maintain or "lock-in" the return. As a result, a temporary "freeze" occurs in the net asset value of the shares of the mutual fund such that the securities in the mutual fund have minimal downside risk in the form of either market or credit risk.

In accordance with a preferred embodiment of the invention, the investment company then offers the net asset value for sale in a secondary on-line auction where bidders pre-register for the auction by establishing a money market fund or other companion investment account with the fund sponsor. If desired, each bidder who qualifies for participation in the auction process can maintain anonymity by establishing a User ID in the registration process. The on-line auction is administered by a server system that includes a web site that bidders may access remotely via a communications network, such as the Internet. The web site provides information about the mutual funds that are open for auction and receives bids on the shares of those mutual funds at a discount to the current net asset value. At the conclusion of the auction, the shares of the mutual fund are redeemed at the current net asset value, thereby providing a gain to the winning bidders. Preferably, this process can be implemented in multiple methods, including but not limited to, a mutual fund termination provision contained in prospectus disclosure, in compliance with Section 8(b) of the 1940 Act.

According to one aspect, the present invention relates to a method of conducting an auction for shares of a pooled investment product that periodically declares a single net asset value comprising the steps of: a) receiving at the server system information relating to the investment product, the investment product having achieved a hurdle rate, the investment product information including a total number of available shares and the net asset value, the net asset value corresponding to the share price of the investment product at the hurdle rate; b) storing at the server system the investment product information; c) opening an auction for the shares of the investment product; d) receiving from bidder computers during the auction bids relating to the investment product, the bids preferably including a bid price per share and the number of shares bid; e) storing the bids on the server system; f) (i) determining a winning bidder, (ii) updating the investment product information by reducing the number of available shares by the number of shares bid by the winning bidder and (iii) repeating steps (i) and (ii) until no available shares remain.

According to another aspect, the present invention relates to a system for auctioning shares of a pooled investment product that periodically declares a single net asset value comprising: a web site accessible via the communications network; means for receiving information relating to the investment product, the investment product having achieved a hurdle rate, the investment product information including a total number of available shares and the net asset value, the net asset value corresponding to the share price of the investment product at the hurdle rate; means for storing the investment product information; means for opening an auction relating to the shares of the investment product; means for receiving during the auction bids from bidder computers, the bids including a bid price per share and a number of shares bid; means for storing the bids; means for successively determining a winning bidder; and means for successively updating the investment product information by reducing the total number of available shares by the number of shares bid by the winning bidder until of all the available shares have been allocated.

The advantages of the present invention are numerous. First, everyday investors can transfer most of their own investment risk to a professional trading firm, investment bank, or other asset manager who can produce excess investment returns in a format, i.e., a mutual fund, which can be freely auctioned to customers only after the risk has been taken and the return achieved by the professional investor. This is the reverse of the current available mutual fund sales process in which consumers invest their money and are immediately exposed to investment risk with their own investment capital. As much as the customer is attracted to such a reversal of the risk process and willing to pay the mutual fund sponsor for the opportunity to bid on such mutual fund shares, the sponsor of such a product is motivated to capture large investor assets in money market funds or other companion investment products that serve both as settlement vehicles for the auction and which qualify customers to enter the auction(s).

Also, because bidders are able to bid on the net asset value of the shares of an investment product after a predetermined hurdle rate has been achieved, bidders are able to determine which bid will yield an acceptable return on their investments. Risk to the investor's investment principal is primarily limited to the opportunity cost of placing a hold on the investor's capital during the auction itself as unsuccessful bidders do not make any payment and successful bidders know in advance that the investment outcome of their bid will be mathematically positive.

In addition, the mutual fund allows a customer to bid on, and potentially purchase shares that would be redeemed in cash to him following the close of the auction at a redemption price, or current net asset value, identified at the beginning of the auction, and one which is higher than the customer paid to purchase the shares. For example, if a customer were able to bid on, and purchase shares, that would be redeemed to him at a price of $10.20, the customer might bid $10.15 per share during the auction. Accordingly, the return on a $25,000 investment would be the difference of the two prices ($10.20–10.15) times the number of shares purchased, or $123.15. This represents a simple return on investment of 0.49%. Alternatively, the customer might bid $10.00 per share for the same shares with a redemption value of $10.20 and receive a $500 gain on the shares, or a 1% simple return on investment. In this way, customers determine what an acceptable return on their investment is, subject to their assessment of how many and how much other bidders will bid for the same available shares.

Finally, because the auction takes place over a communications network, the investment company is able to achieve a larger market for its investment products. Numerous bidders in a plurality of locations are able to participate in the auction simultaneously. A bidder only needs access to a communications network, such as the Internet. In addition, the auction process can be carried out over a much longer period of time than is traditionally possible, for example a period of days rather than hours. As such, customer participation during "off-hours" is possible.

These above features and advantages, as well as the many other features and advantages described below, are not all inclusive. Many additional features and advantages will be apparent to one of ordinary skill in the art in view of the drawings, detailed description, and claims hereof.

BRIEF DESCRIPTION OF THE DRAWINGS

These and other objects, features and advantages of the invention are more fully set forth in the accompanying Detailed Description of the Invention in which:

FIG. 9 is an illustrative web page showing information about auctions that may be bid on;

DETAILED DESCRIPTION OF THE INVENTION

As discussed above, the present invention relates to a system and method for auctioning shares of a pooled investment product, whose net asset value can be determined at a forward date or otherwise specified.

Figure 1:
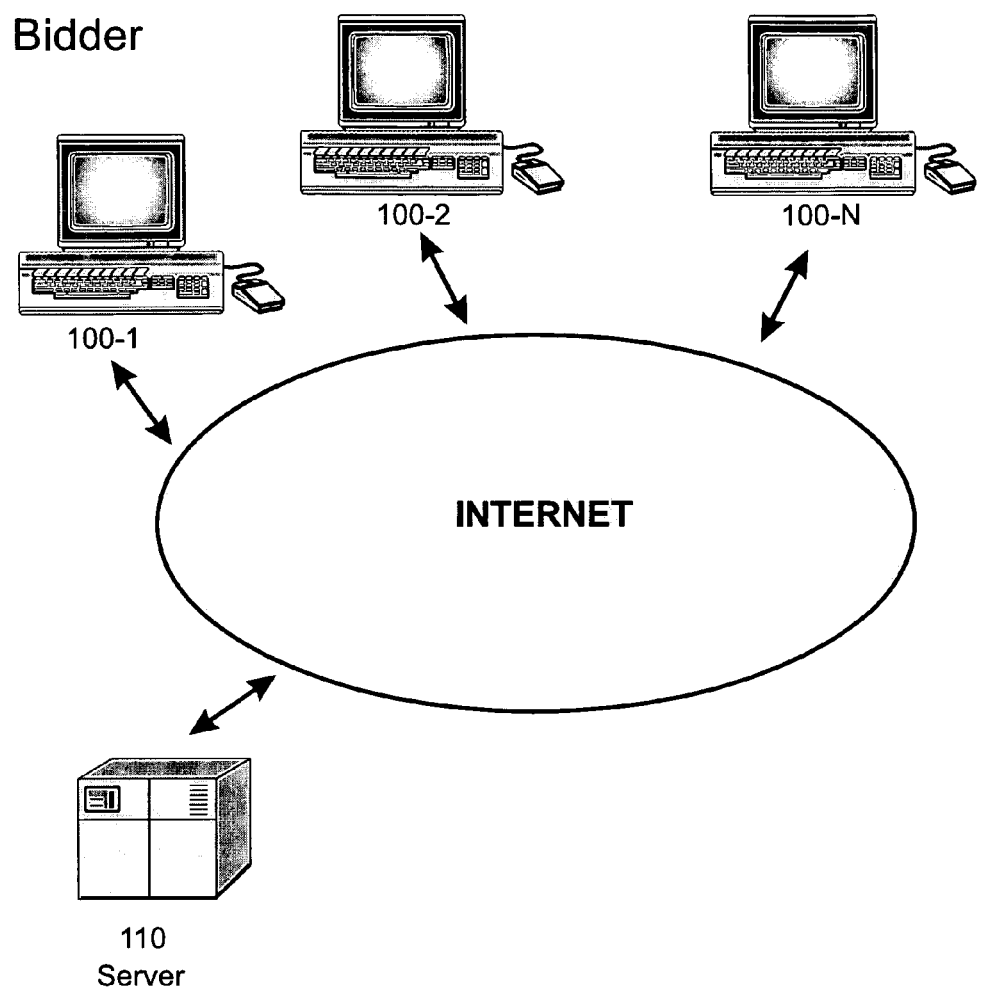
FIG. 1 is a high-level diagram showing a server and a plurality of bidder computers interconnected via a communications network.

These auctions are preferably run by a server system that is accessible to bidders via a communications network. FIG. 1 depicts a high-level diagram of a server system 110 as connected to a plurality of bidder computer systems 100 via a communications network, such as the Internet.

Figure 2:
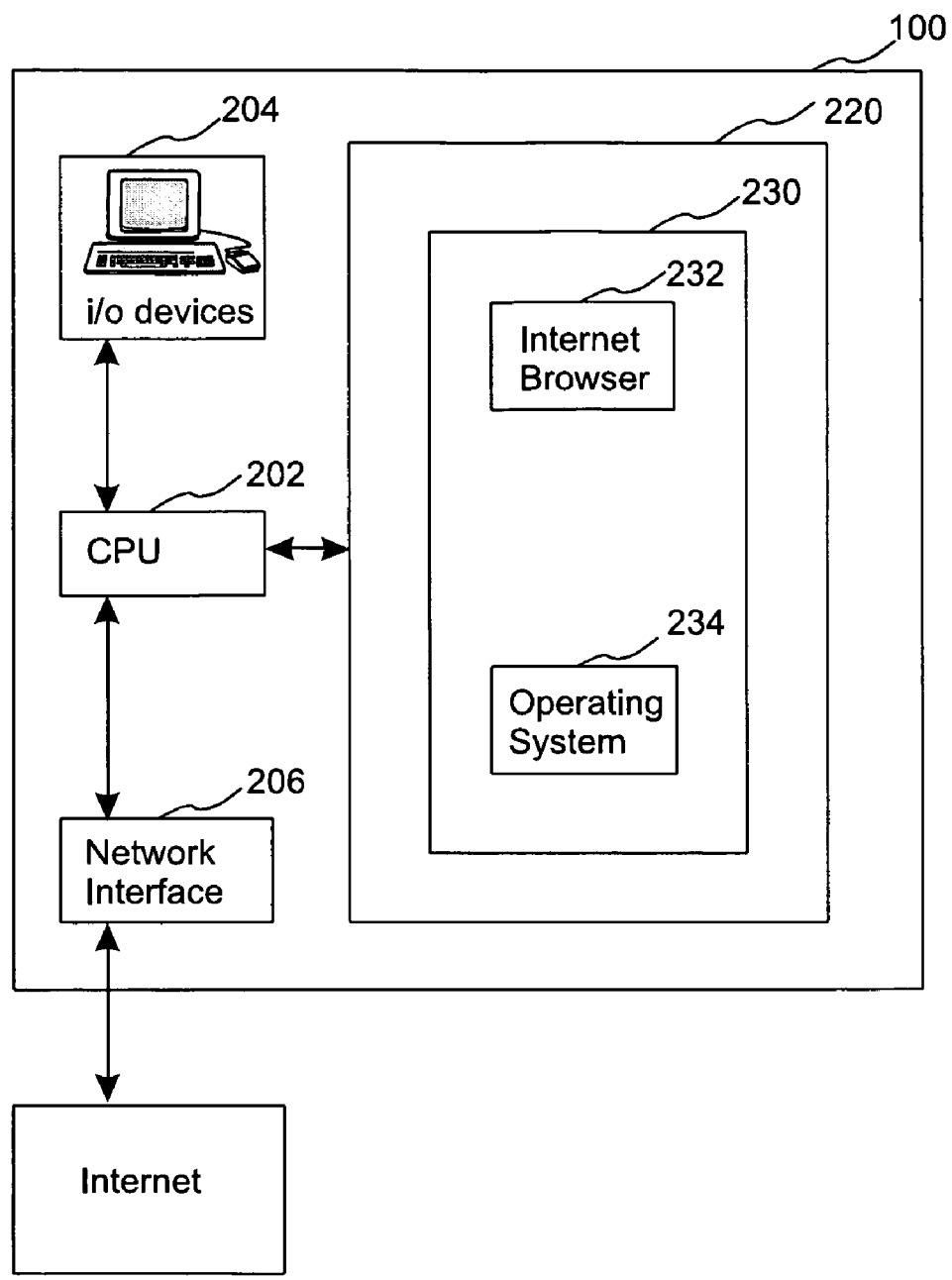
FIG. 2 is a high-level diagram of a preferred bidder computer system of the present invention.

FIG. 2 depicts a high-level diagram of an illustrative bidder system 100. The bidder system may comprise any computer system that allows the bidder to access the server system. For example, and as is well known, bidder system 100 may be a programmed general purpose computer that includes a processor 202; memory 220; I/O devices 204 such as a monitor, a mouse, and a keyboard; and a communications network interface 206 that allows the computer to access the server system.

Figure 3:
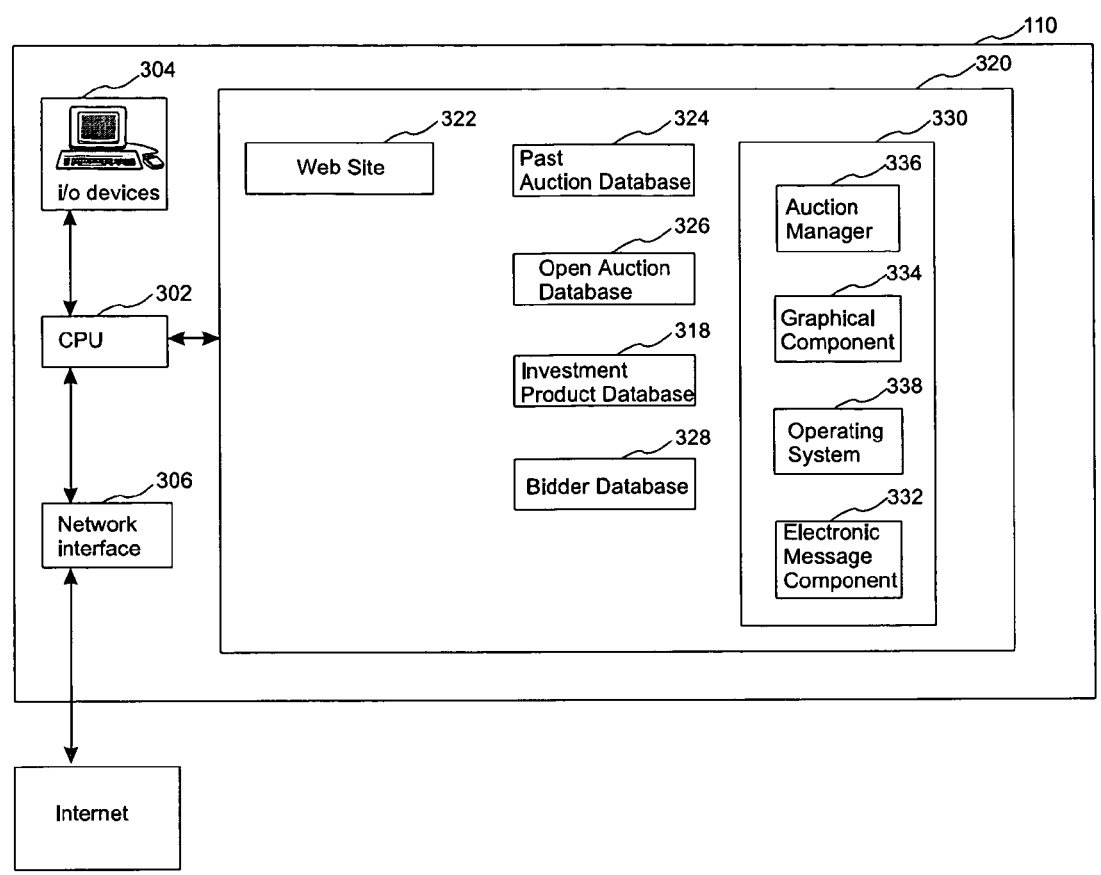
FIG. 3 is a high-level diagram of a preferred server system of the present invention.

FIG. 3 depicts a high-level diagram of a preferred server system 110 of the present invention. As is shown, the server system 110 may be a general purpose computer that includes a processor 302, memory 320, and a system web site 322 that is accessible via the Internet. The server system 110 memory preferably includes: (1) a bidder database 328, (2) an investment product database 318, (3) an open auction database 326, (4) a past auction database 324, and (5) computer programs 330 that allow server system 110 to operate in accordance with the invention. As is well known, some or all of the stored databases can be located apart from server system 110 and connected thereto by a communications network.

Bidder database 328 includes information about the bidders, and preferably includes for each bidder, information concerning:
 (1) bidder name;
 (2) bidder account information;
 (3) available balance;
 (4) bid information;
 (5) bidder account history;
 (6) bid control number; and
 (7) bidder registration information.

Investment product database 318 includes information about the investment products for auction, and preferably includes for each investment product, information concerning:
 (1) investment product name;
 (2) investment product total market value;
 (3) a total biddable return;
 (4) a final or redemption share price;
 (4) a maximum price per share;
 (5) a minimum price per share;
 (6) an auction opening time; and
 (7) an auction closing time.

In a preferred embodiment, the investment product is a mutual fund. In such an instance, a mutual fund's total market value is preferably calculated by multiplying the number of shares of the mutual fund by the purchase price per share paid upon creation of the mutual fund. The total biddable return for the mutual fund is preferably calculated by taking the difference between the total market value of the mutual fund at its creation and the total market value of the mutual fund at its liquidation (i.e., when it hits its investment return hurdle-rate), divided by the total number of shares of the mutual fund.

In a preferred embodiment, bids are made in increments of whole cents per share. The maximum bid price per share is one cent less than the redemption price, or current net asset value, of the mutual fund. The minimum bid price per share preferably is the purchase price per share paid upon creation of the mutual fund, but can be any price less than the mutual fund's current net asset value, which is typically priced in dollars and whole cents for U.S. dollar-denominated funds.

In a preferred embodiment, the auction opening and closing times are predetermined. The duration of the auction is typically 18–24 hours.

Open auction database 326 includes information concerning the auctions, and preferably includes for each such auction identification of the bidders and the bids they have made.

In a preferred embodiment, the current highest bid during an auction may be periodically calculated by the server. If so, information concerning the current highest bid may also be stored in the open auction database.

Past auction database 324 includes information about auctions which have been completed, and preferably includes for each such auction, information concerning:
 (1) investment product name;
 (2) number of bidders who participated in the auction;
 (3) ratio of total shares bid to total shares available at auction;
 (4) ratio of winners to bidders;
 (5) average dollar bid;
 (6) biddable total return;
 (7) investment product total market value;
 (8) the price per share at liquidation;
 (9) shares available at auction;
 (10) an auction opening time; and
 (11) an auction closing time.

The auction manager 336 software component runs the investment product auctions on the web site. In a preferred embodiment, the auction manager opens and closes the auctions, verifies and stores bids for the auctions, determines the winning and losing bidders, and calculates the other data relating to the auctions discussed herein.

The graphical component 334 may comprise any software that can create graphs and/or tables based on the data stored at server system 110. These graphs and tables may be requested by bidders at the web site 322.

The electronic message component 332 may comprise any software that transmits electronic messages to bidders over a communications network, such as the Internet. Electronic message component 332 also transmits bidder registration data and winning bidder information, such as the number of shares bid by each winning bidder, to the mutual fund's transfer agent for the purpose of settling the winning transactions. Preferably, the transfer agent determines each winning bidder's ownership of the shares of mutual fund, thereby effectuating purchase of the shares before the shares are redeemed at the redemption price, or the current net asset value.

Having described illustrative server and bidder systems, the operation of the auction process is now described.

In a preferred embodiment, an investment company first creates an investment product (e.g., a mutual fund) which declares a daily or periodic single share price with itself as sole shareholder. After the investment product returns a pre-determined hurdle rate, or rate of return, through the appreciation and or sale of the underlying securities in the mutual fund, the investment company then preferably liquidates its investment positions in the investment product and invests the proceeds in cash or cash equivalent instruments in order to freeze the net asset value of the shares of the mutual fund. As discussed above, the net asset value, or unit price per share, is preferably calculated by dividing the total assets of the mutual fund, minus expenses and liabilities, by the number of shares in the mutual fund.

In the preferred embodiment the hurdle rate is positive. The auction process of the present invention, however, may be run for an investment product that has achieved a negative rate of return since its inception. In this case, bidders preferably begin bidding at a net asset value less than the final redemption net asset value.

The process by which the investment product is created, reaches its predetermined investment return hurdle rate, and is liquidated to freeze the net asset value is unimportant to the present invention. This process may be automated, semi-automated, or simply performed manually by one or more employees of the investment company, as is well known in the art.

In any event, once the investment product is available for auction, information relating to the investment product is stored at server system 110. In a preferred embodiment, the following information about the investment product is provided to the server: investment product name, total market value, total biddable return, redemption price per share, maximum price per share, minimum price per share, and auction opening and closing times (i.e., the information that is preferably stored at investment product database 318.)

Figure 4:
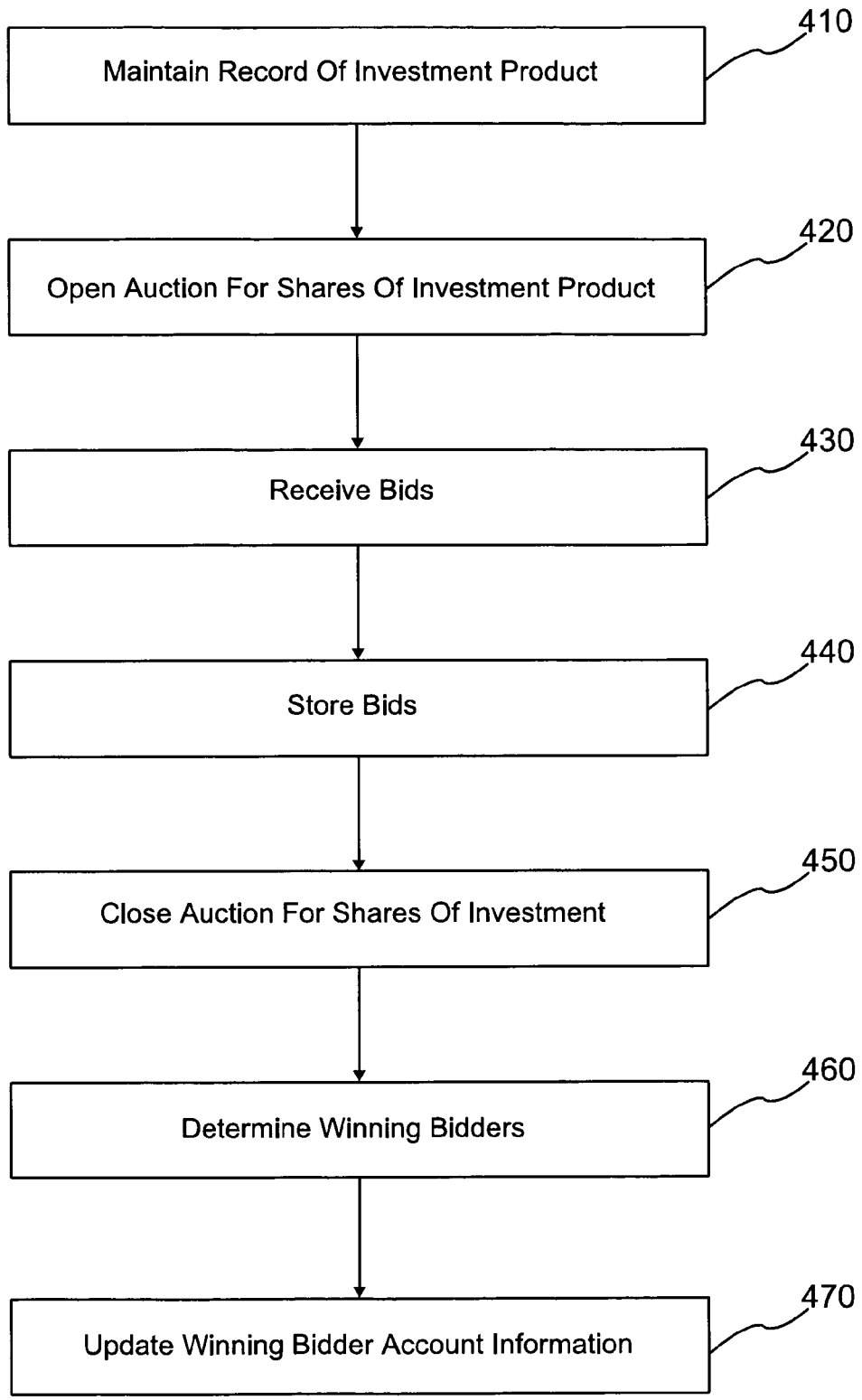
FIG. 4 is a flowchart showing a preferred general operation of the present invention.

FIG. 4 is a flowchart depicting the preferred general operation of the present invention once data describing a particular investment product has been entered into server system 110. As illustrated by step 410, the investment product data is received at server system 110. At some predetermined time, the shares of the investment product are then opened for auction (step 420). During the auction, the server system 110 receives and stores (steps 430 and 440) the bids made for the shares. In a preferred embodiment, these bids include a bid price per share and the number of shares bid.

In step 450, the auction for the shares of the investment product is closed. The server then determines the winning bidders (step 460) according to one or more auction method formulas, including but not limited to highest bidder, highest and earliest bidder, or the earliest bidders in sequence from the auction start, regardless of price bid. In a preferred embodiment, for example, the server successively determines the winning bidder by determining the bidder with the highest price per share bid. If there is more than one bidder with the highest bid price per share, then the winning bidder is the bidder who bid the highest number of shares bid. If there is more than one bidder with the highest bid price per share and the highest number of shares bid, then the winning bidder is the bidder who bid earlier in time. The server reduces the number of shares in the investment product to be distributed by the number of shares bid by the winning bidder and allocates them to the winning bidder. The server then determines the next winning bidder among the bidders who have not been allocated shares and reduces the number of shares in the investment product to be distributed by the number of shares allocated to the next winning bidder, and so on, until all of the available shares have been allocated. In the highest bid formula described here, earliest time of bid determines the winning bidder if multiple bids are received at the same price and if the last shares to be allocated are at a price for which there are multiple bidders.

Finally, in step 470, the server updates the bidder account information for the winning bidders to reflect a purchase of the number of shares bid and a return according to whatever auction method is utilized. In a preferred embodiment, the return for each winning bidder is the difference between the current net asset value share price and the winning bidder's share price bid multiplied by the number of shares bid. Preferably, the current net asset value is the redemption price of the shares after the auction is complete.

The preferred processes for performing the steps of FIG. 4 are now described.

Figure 5:
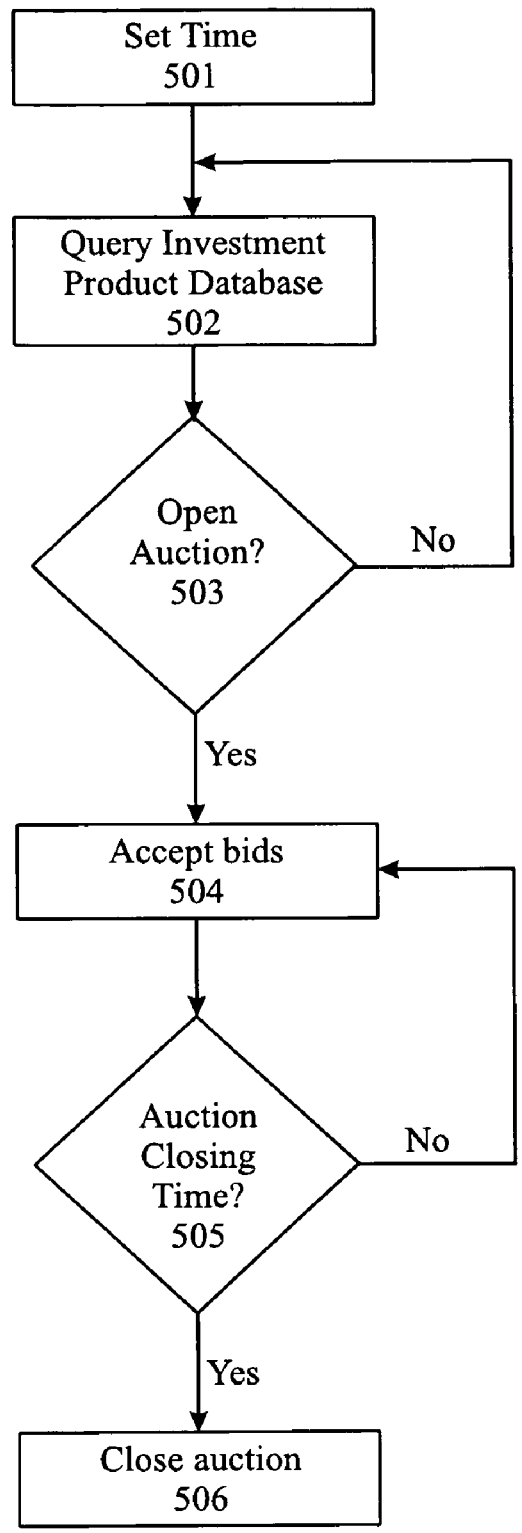
FIG. 5 is a flowchart showing a preferred process of opening and closing an auction.

FIG. 5 is a flowchart showing the auction opening (step 420) and closing process (step 450) according to a preferred embodiment of the present invention. In step 501, auction manager 336 maintains time in accordance with a timing component (not shown). In step 502, auction manager 336 continuously or periodically queries the investment product database 318 in order to determine whether any investment products should be opened for auction. In step 503, auction manager 336 determines whether to open any auctions. If so, auction manager 336 opens the investment product for auction; and allows bids to be submitted for that investment product, step 504. As illustrated by steps 505 and 506, at the designated auction closing time, auction manager closes bidding on the auction. In a preferred embodiment, auction manager 336 may have more than one investment product open for auction and conduct the auctions simultaneously.

Figure 6:
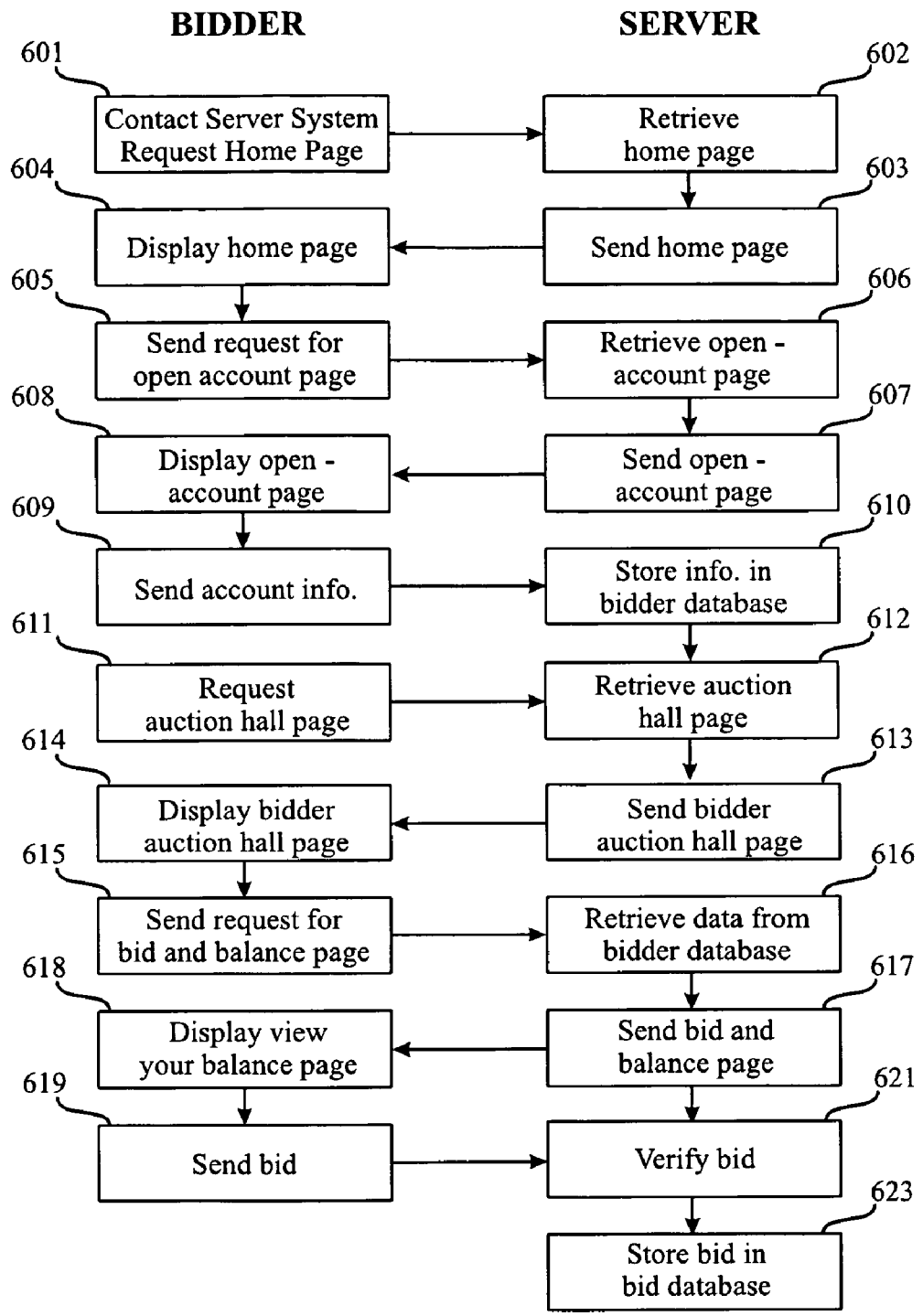
FIG. 6 is a flowchart showing a preferred process of receiving and storing bids.

FIG. 6 is a flowchart showing a preferred process for receiving (step 430) and storing bids (step 440). In step 601, bidder establishes contact with server system 110, preferably via the Internet. As illustrated by steps 602–604, in response, server system 110 retrieves and transmits for viewing on the bidder's computer the home page of the web site.

Figure 7:
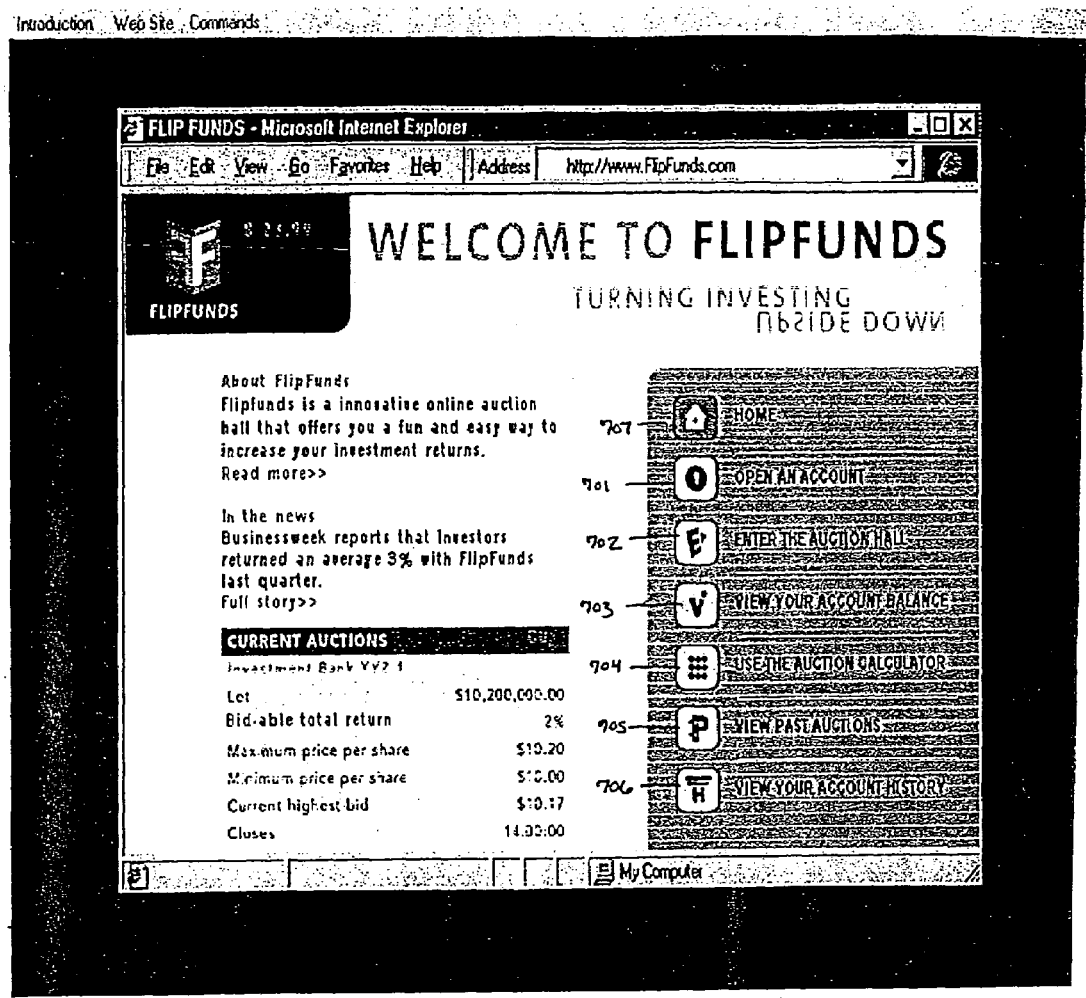
FIG. 7 is an illustrative web home page.

An illustrative web home page is shown in FIG. 7. At the home page, the bidder can preferably select one of a plurality of hyperlinks 701–706 associated with the other pages of the web site.

If the bidder is new to the web site, he preferably selects hyperlink 701 to request a web page that will allow the bidder to open an account, step 605. As illustrated by steps 606–608, server system 110 then retrieves and transmits for display on the bidder's computer an open-account web page.

Figure 8:
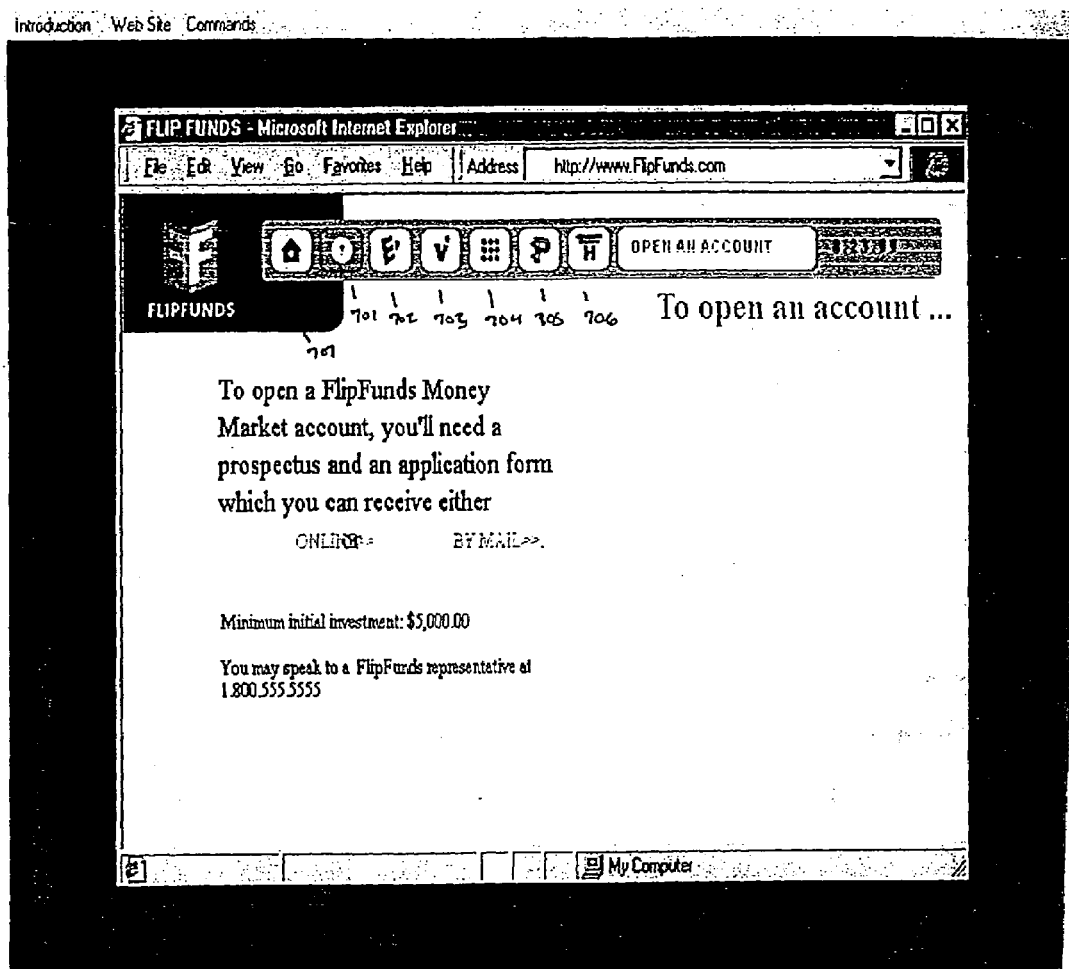
FIG. 8 is an illustrative web page that allows a bidder to open an account.

An illustrative web page that allows the bidder to open an account is shown in FIG. 8. At this web page 800, the bidder can establish an account with the investment company. This account serves as a settlement vehicle by placing a hold on the bidder's account for the amount of the bidder's bid multiplied by the number of shares bid. In a preferred embodiment, this account is a money market account in which amounts placed on hold continue to earn interest while the hold is in place.

In step 609, the bidder system 100 transmits his account information to server system 110. In step 610, server system 110 receives the bidder's account information and stores it in bidder database 328.

Once the bidder establishes an account, or alternatively if he already has an account, the bidder may select a hyperlink to request (step 611) a web page showing auctions that are open for bidding. As illustrated by steps 612–614, server system 110 then retrieves and transmits for display on the bidder's computer a web page providing the relevant auction information.

Figure 9:
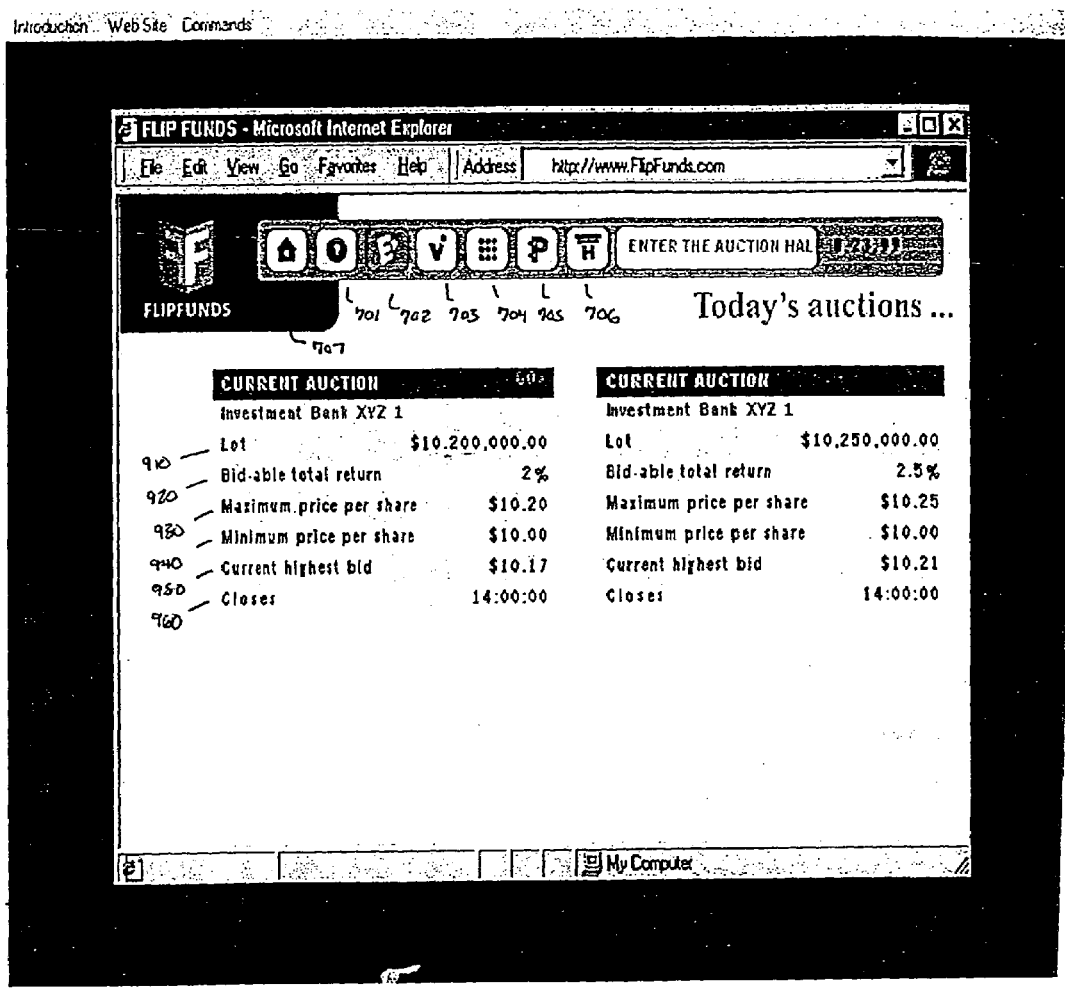

An illustrative web page showing auctions that are available to bid on is shown in FIG. 9. At this page 900, the bidder may view information about current and future auctions. In a preferred embodiment, for each current auction, the page lists the total market value (910) and shares available (not shown) of the investment product being auctioned, the total biddable return (920), the maximum price per share (930), the minimum price per share (940), the current highest bid (950), and the time (960) that the auction closes.

If the bidder wishes to participate in a current auction, bidder preferably selects hyperlink 703 to request (step 615) a web page that displays his account balance and which allows him to submit a bid. In steps 616–618, server system 110 retrieves the account data and transmits for viewing on the bidder's computer a web page that allows the bidder to bid on the current auctions.

Figure 10:
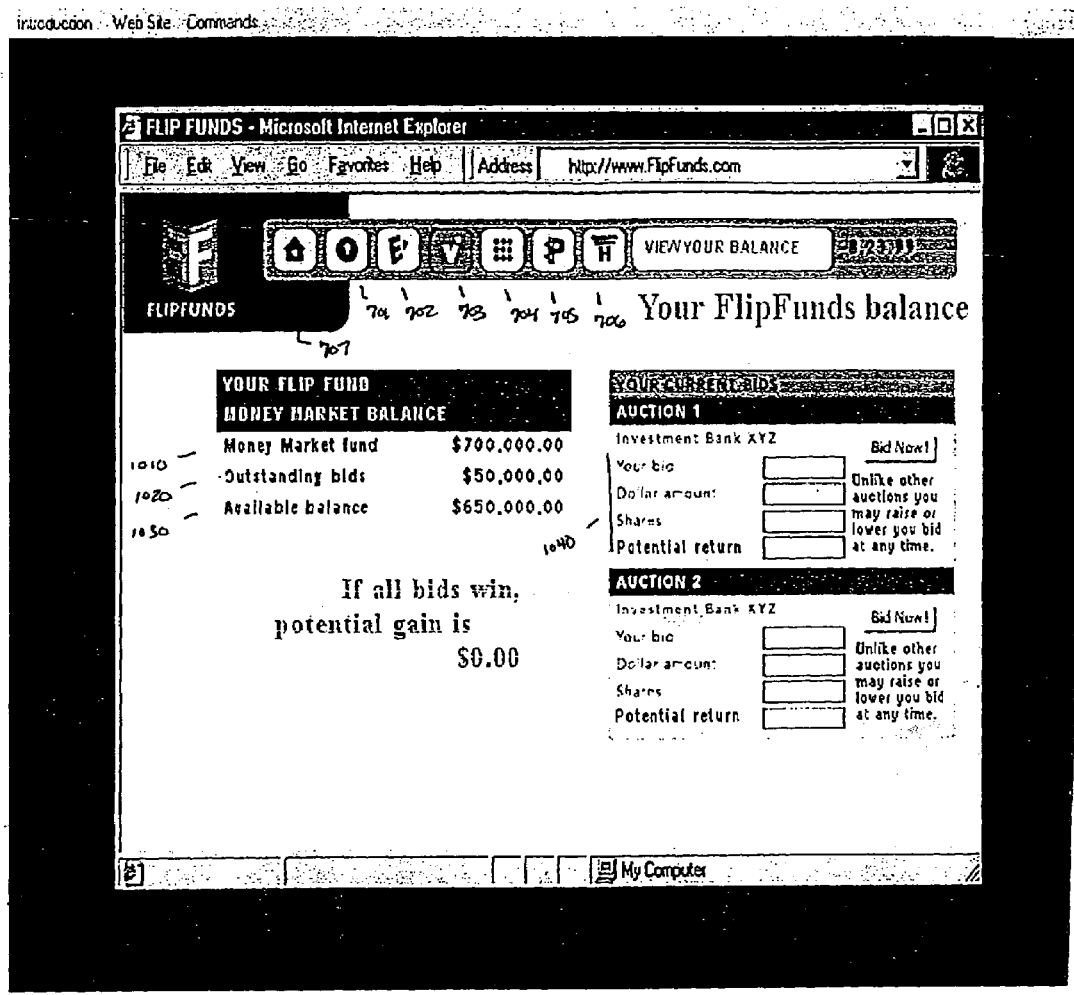
FIG. 10 is an illustrative web page that allows the bidder to view his account balance and place bids on auctions.

An illustrative web page allowing the bidder to bid on the auctions is shown in FIG. 10. At this web page 1000, the bidder is able to: view the balance 1010 of his account; view the value 1020 of his current outstanding bids; view his available balance 1030; and place bids 1040 in current auctions. In order to place a bid, the bidder preferably provides his bid for price per share and the number of shares bid.

In a preferred embodiment, the bid must be within the maximum price per share (See 930 of FIG. 9) and the minimum share price per share (See 940 of FIG. 9) set by the investment company for the investment product open for auction. The investment company sponsor thus controls the return it is willing to accept for use of its capital upon sale of the shares of the investment product in the auction.

Returning to FIG. 6, in step 619, the bidder transmits his bid to the server system 110. As illustrated by steps 621–623, the server system 110 receives the bid request and determines whether the bid is an acceptable bid.

Figure 11:
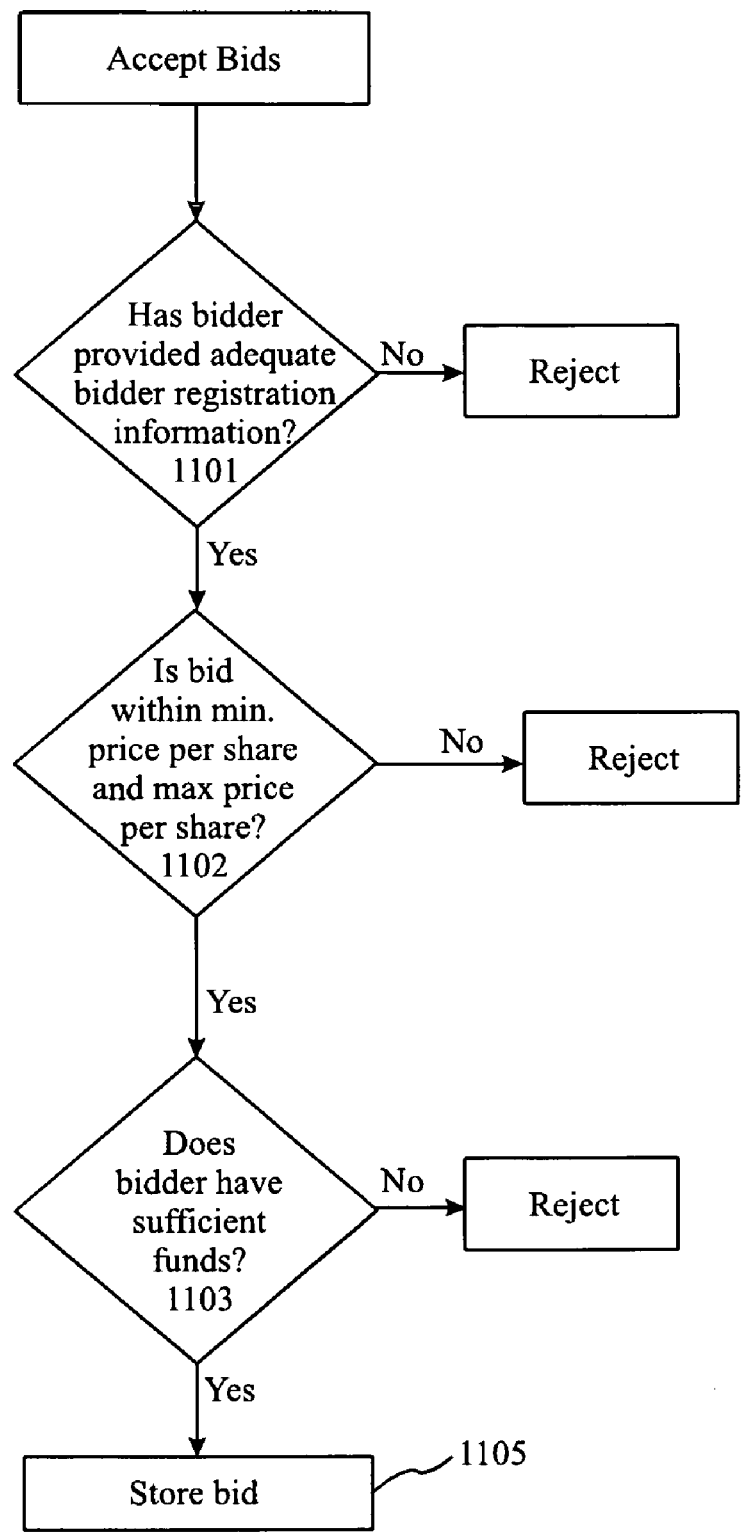
FIG. 11 is a flowchart showing a preferred process of verifying bids.

A preferred process for verifying whether a particular bid is acceptable is shown in FIG. 11. As is illustrated, auction manager 336 first determines (step 1101) whether the bidder has provided adequate bidder registration information. Typically, this information includes, but is not limited to, the bidder's name, address, and tax identification information. Next, auction manager 336 determines (step 1102) whether the bid is within the minimum price per share and maximum price per share set by the investment company. Next, it determines (step 1103) whether the bidder has sufficient funds in his account to cover the bid by multiplying the bidder's bid price per share by the number of shares bid. If the bid fails any of these tests, the server preferably asks the bidder to change his bid as appropriate. On the other hand, if the bid is verified, the server system 110 then stores (step 623,1105) the bid information in open auction database 326 and bidder database 328. Preferably, server system 110 also places a "hold" on the bidder's account by reducing the bidder's available account balance in bidder database 328 by the amount of the bid (i.e., the bid price per share multiplied by the number of shares bid). In a preferred embodiment, the holds remain in place until the next business day following the close of the auction period. In the case of winning bidders, the hold may exist until settlement of the transaction which may or may not coincide with the redemption of the shares at the redemption price.

As discussed above, in step 460, the server system 110 determines winning bidders according to one or more auction method formulas. In a preferred embodiment, server system 110 successively determines the winning bidder. The winning bidder corresponds to the bidder with the highest bid price per share. If there is more than one bidder with the highest bid price per share, then the winning bidder is the bidder who bid the highest number of shares bid. If there is more than one bidder with the highest bid price per share and the highest number of shares bid, then the winning bidder is the bidder who bid earlier in time.

Figure 12:
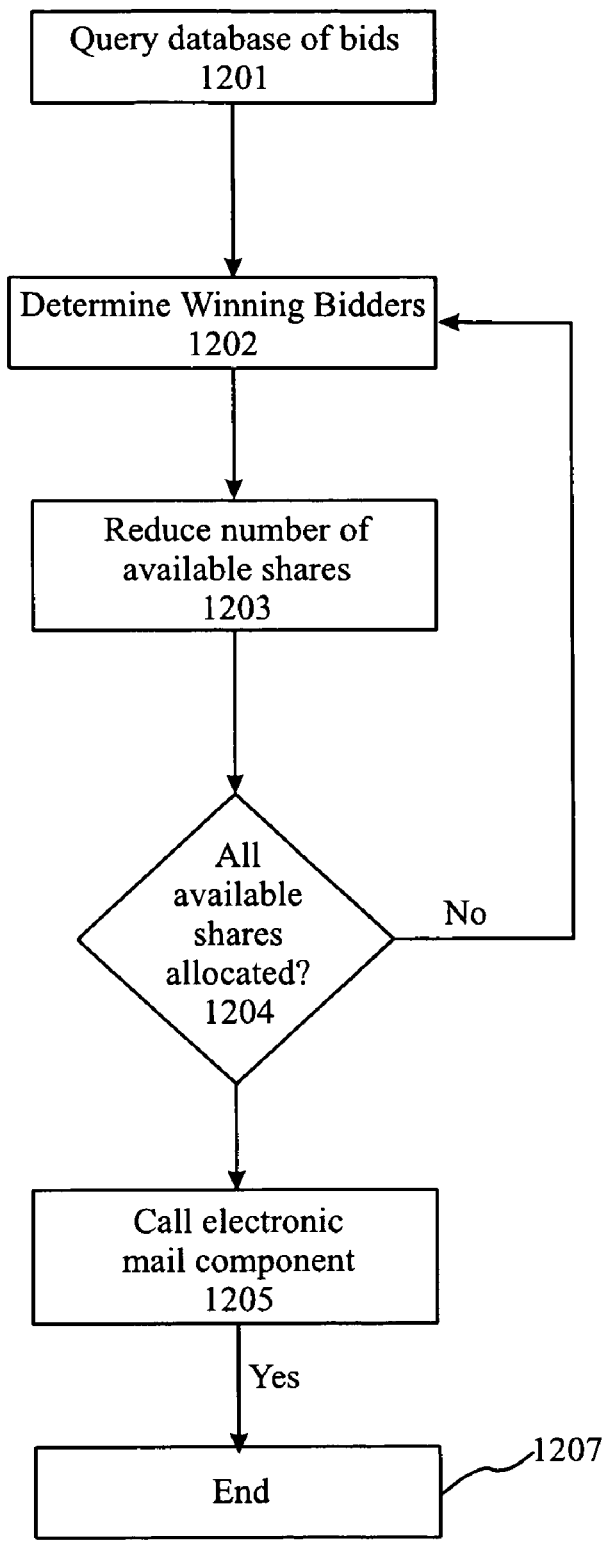
FIG. 12 is a flowchart showing a preferred process of determining winning bidders.

FIG. 12 depicts a preferred process for determining the winning bidders according to a highest bidder auction formula. In step 1201, auction manager 336 queries open auction database 326 to determine all bids for the mutual fund whose auction has just closed. In step 1202, auction manager 336 determines a winning bidder. The winning bidder is preferably the bidder who made the highest price-per-share bid. In step 1203, auction manager 336 reduces the number of shares available to be distributed to the winning bidder by the number of shares bid by the just-determined winning bidder.

In step 1204, auction manager 336 determines whether all of the available shares have been allocated. If not, auction manager 336 repeats steps 1201–1203 and successively determines the next winning bidder until all the available shares have been allocated. In step 1205, auction manager 336 calls electronic message component 232. Electronic message component 332 generates a message notifying the highest bidder that he has won, and the message is sent to the bidder system. It should be noted that the server need not calculate all the winning bidders before calling the electronic message component to send e-mails to the winning bidders. Electronic message component 332 also transmits bidder registration information and winning bidder information to the mutual fund's transfer agent for the purpose of settling the winning transactions.

Figure 13:
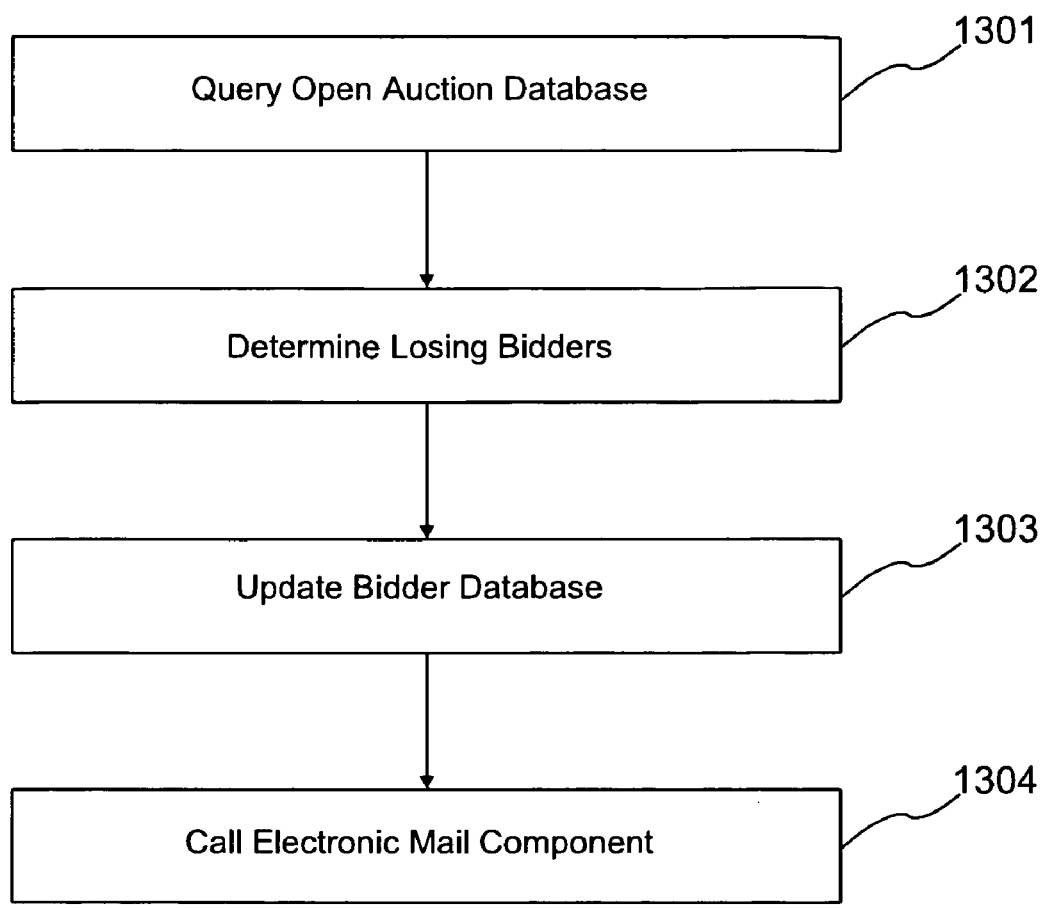
FIG. 13 is a flowchart showing a preferred process of determining losing bidders.

FIG. 13 is a flowchart showing a preferred process for determining the losing bidders of a particular auction. In step 1301, auction manager 336 queries open auction database 326. In step 1302, auction manager 336 determines the losing bidders. In step 1303, server system 110 updates bidder database 328 by adding to the respective losing bidders' available balances their respective price per share bids multiplied by the number of shares bid thereby releasing the holds placed on the aforementioned money market accounts of those bidders. In step 1304, auction manager 336 calls electronic message component 332. Electronic message component 332 generates messages notifying the bidders that they have not won. Server system 110 then sends the messages to the non-winning bidders. Preferably server system 110 sends electronic messages to all losing bidders who participated in the auction.

The auction manager 336 also preferably keeps track of the number of winning bidders, the number of winning bids, the ratio of the total number of shares bid to the total number of shares available for auction, the ratio of winners to bidders, and the average dollar bid. Preferably, server system 110 also updates past auction database 324 with past auction data in addition to the investment product data obtained from investment product database 318 on the investment product auctioned.

Figure 14:
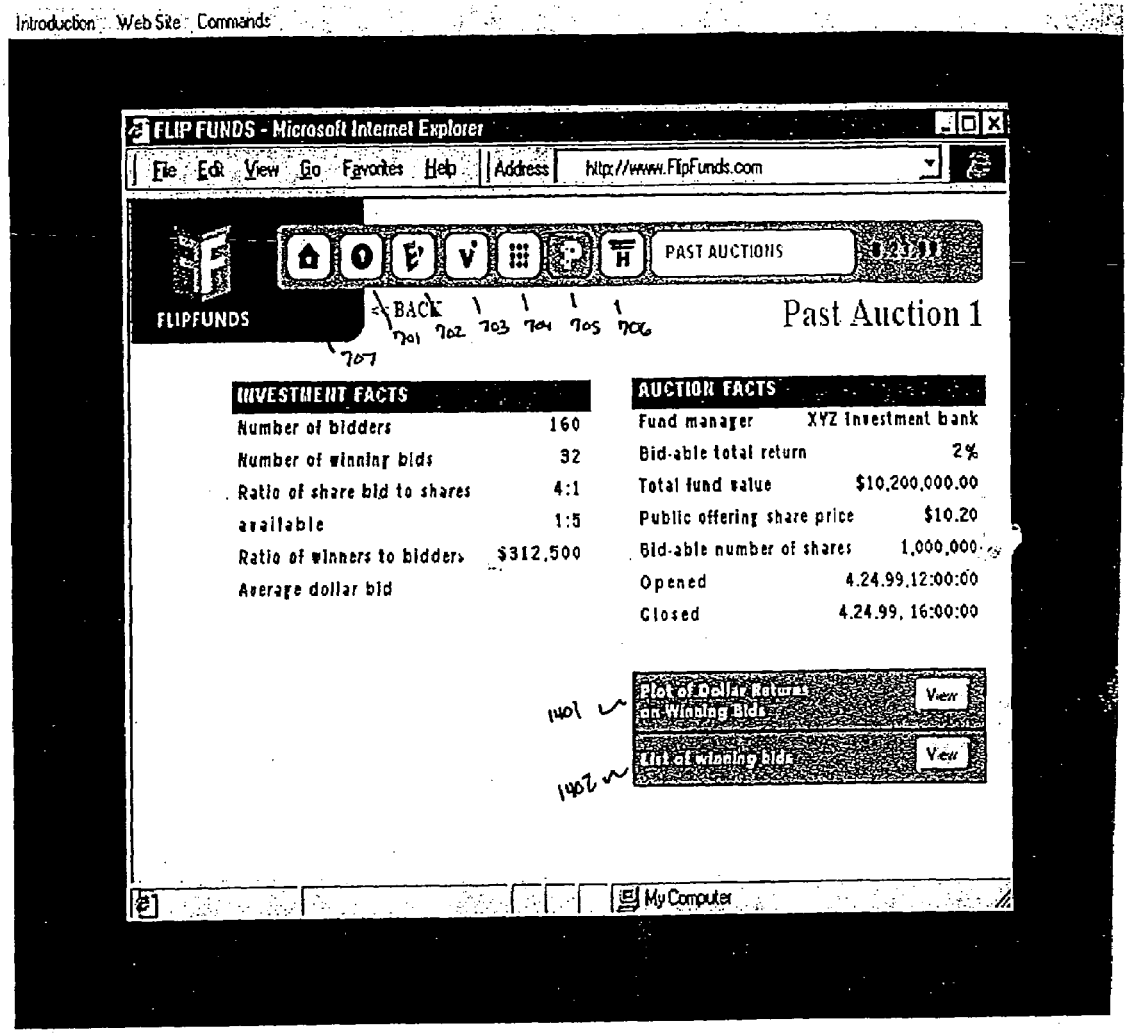
FIG. 14 is an illustrative web page showing information about a past auction.

FIG. 14 is an illustrative web page showing information about a past auction. This page preferably displays the number of winning bidders, the number of winning bids, the ratio of the total number of shares bid to the total number of shares available for auction, the ratio of winners to bidders, and the average dollar bid. At past auction page 1400, bidder can preferably select one of a plurality of hyperlinks 1401–1402 in order to view graphical or tabular data regarding past auctions.

Figure 15:
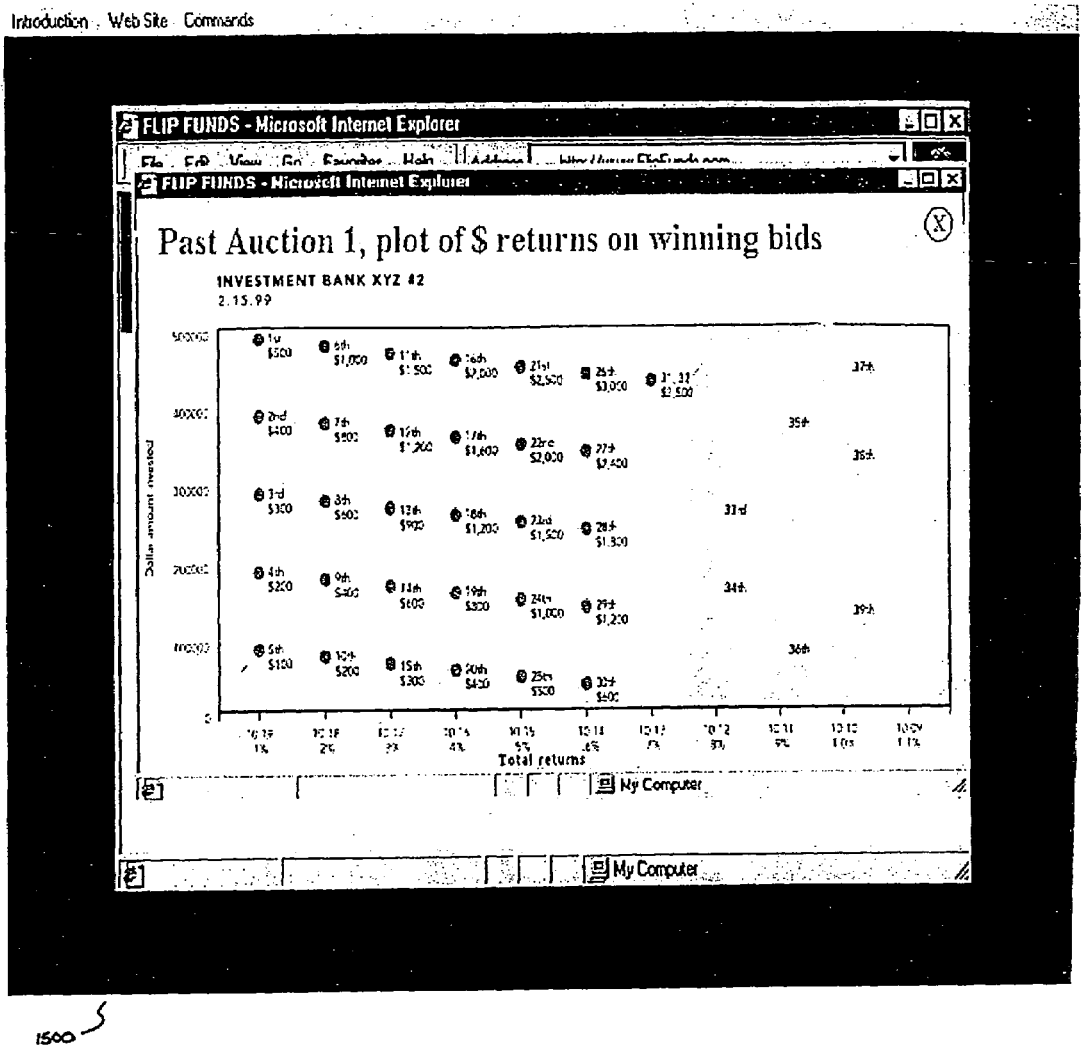
FIG. 15 depicts an illustration of a preferred dollar return on winning bids plot according to a highest bidder auction formula.

Preferably, if bidder selects hyperlink 1401, bidder is able to view a plot of dollar returns on winning bids. FIG. 15 depicts an illustration of a preferred dollar return on winning bids plot according to a highest bidder auction formula. In this example, the net asset value of the shares of the investment product is $10.20. Winning bidders bidding $10.19 earn a 0.1% rate of return. As such, winning bidders whose bids have a total dollar value of $500,000 earn a return of $500. This scenario is represented by plot point 1501.

Figure 16:
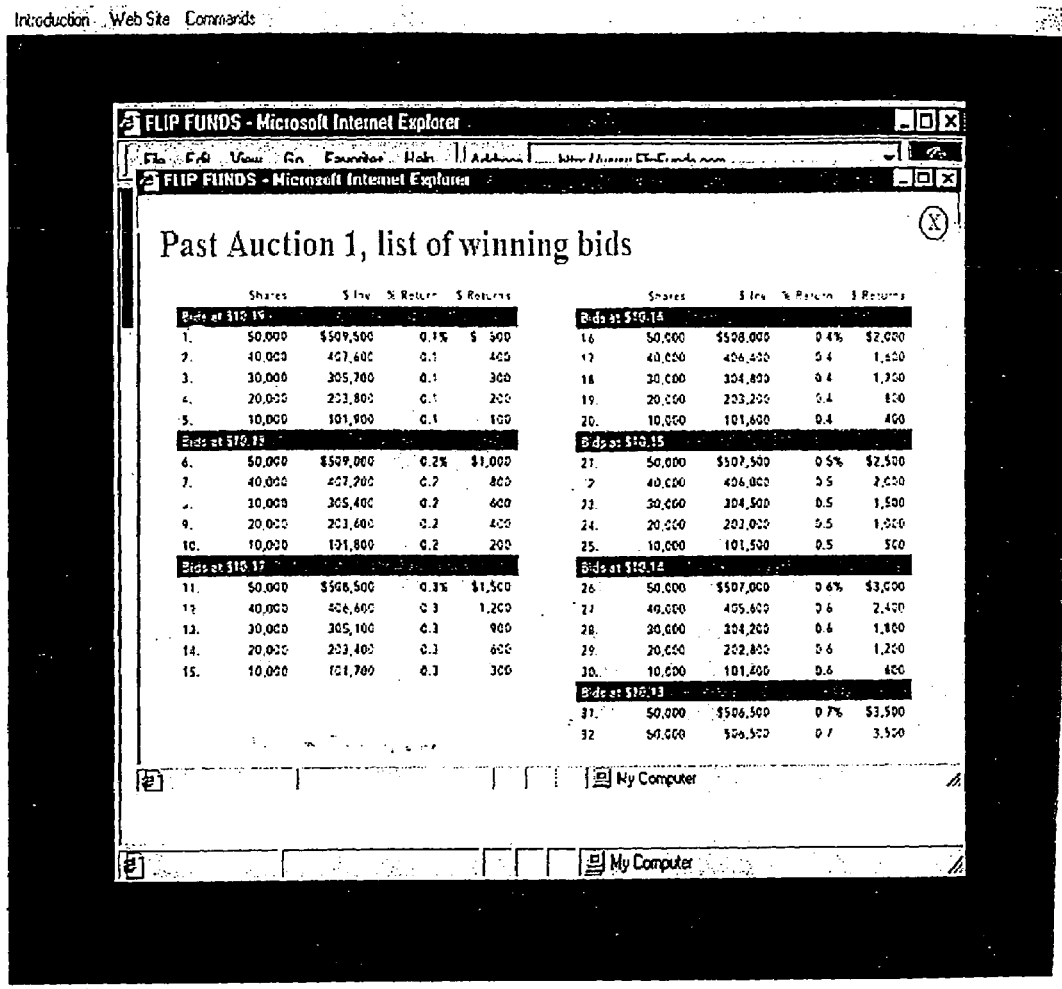
FIG. 16 depicts an illustration of a preferred list of winning bids according to a highest bidder auction formula.

If bidder selects hyperlink 1402, bidder is able to view a list of winning bids. FIG. 16 depicts an illustration of a preferred list of winning bids according to a highest bidder auction formula. In this example, the net asset value of the shares of the investment product is $10.20. Winning bidders bidding $10.19 earn a 0.1% return. As such, winning bidders whose number of share bids equals 50,000 and whose bids have total dollar value of $509,500 earn a return of $500. This scenario is represented by line 1601.

While the present invention has been described with reference to the preferred embodiments, those skilled in the art will recognize that numerous variations and modifications may be made without departing from the scope of the present invention. This is especially true with regard to the presentation of information and configuration of web page displays, which may be varied greatly without departing from the scope of the present invention. Moreover, while a preferred embodiment regarding the system architecture of the present invention has been disclosed in connection with FIG. 1, in view of the foregoing description, other system architectures that can carry out one or more of the methods of the present invention may also be available, and all such other system architectures are contemplated to be within the scope of the present invention. For example, a system falling within the scope of this invention could employ a different configuration for the data storage, such as combining the databases, etc. In view of the foregoing, it should also be clear that only certain portions of the data preferably stored at server are necessary for carrying out the various methods of the present invention. (By way of example, the data preferably stored in past auction database is not utilized by the server when running a particular auction.) Moreover, as is well known in the art, the operation of the server, could be divided among a number of computer devices. Accordingly, it should be clearly understood that the embodiments of the invention described above are not intended as limitations on the scope of the invention, which is defined only by the claims that are now or may later be presented.

What is claimed is:

1. In a communications network having a server system capable of communicating with a plurality of bidder systems of a plurality of bidders, a method of conducting an auction for shares of a pooled investment product comprising:

receiving at the server system investment product information after the pooled investment product has achieved a hurdle rate, the investment product information comprising:
a total number of available shares;
a redemption price per share corresponding to a price per share of the pooled investment product at the hurdle rate;
a maximum bid price per share; and
a minimum bid price per share;

opening an auction for the shares of the investment product;

receiving at the server system bids from the bidders relating to the investment product, each bid comprising a bid price per share and a number of shares bid, wherein the bid price is greater than or equal to the minimum bid price per share and less than or equal to the maximum bid price per share;

successively determining a successive winning bidder at the server system, wherein each winning bidder receives a guaranteed return equal to the difference between the redemption price per share and the bid price per share multiplied by the number of shares bid by the winning bidder; and successively reducing the total number of available shares by the number of shares bid by each winning bidder.

2. A method of bidding on shares of a pooled investment product in an auction, the method comprising:

electronically submitting a bid via a bidder system to a server system, the bid being on shares of the pooled investment product after the investment product has achieved a hurdle rate and comprising:
a bid price per share, wherein shares of the pooled investment product have a price per share at the time of the bid, the bid price per share being less than the net asset value per share of the pooled investment product at the time of the bid, the bid thus corresponding to a guaranteed return per share comprising the net asset value per share of the pooled investment product at the time of the bid minus the bid price per share; and
a number of shares bid;

winning the auction;

receiving the number of shares bid of the pooled investment product; and redeeming the number of shares bid of the pooled investment product at the guaranteed return per share.

3. A method of conducting an auction for shares of a pooled investment product that periodically declares a single net asset value comprising:

identifying a net asset value of the pooled investment product after the pooled investment product achieves a predetermined rate of return, wherein the net asset value corresponds to a share price of the pooled investment product at the predetermined rate of return;

opening an auction for the shares of the pooled investment product;

receiving from a plurality of bidders during the auction a variety of bids for shares of the pooled investment product, the bids including a bid price per share and a number of shares bid;

determining a winning bidder based on the variety of bids;

reducing shares available for auction by the number of shares bid by the winning bidder; and repeating the steps of determining the winning bidder and reducing the shares available for auction.

4. The method of claim 3 further comprising:

maintaining bidder account information corresponding to each bidder; and updating the bidder account information for each of the winning bidders to reflect a return, the return equaling the difference between the net asset value and the respective winning bidder's bid price per share multiplied by the number of shares bid by the respective winning bidder.

5. The method of claim 3 wherein the winning bidder is the bidder who bid the highest bid price per share.

6. The method of claim 3 comprising generating electronic messages and transmitting electronic messages td the bidders.

7. The method of claim 2 further comprising:

generating an electronic message, the electronic message comprising bidder registration information and winning bidder information; and transmitting the electronic message to a transfer agent.

8. The method of claim 3 further comprising:

receiving purchase information for each of the winning bidders, the purchase information relating to a purchase by each of the winning bidders of a number of shares bid by each of the respective winning bidders at the respective winning bidder's bid price per share.

* * * * *